(No Model.)
J. M. KELLY.
SAFETY DEVICE FOR STREET CARS.
No. 507,138.  Patented Oct. 24, 1893.
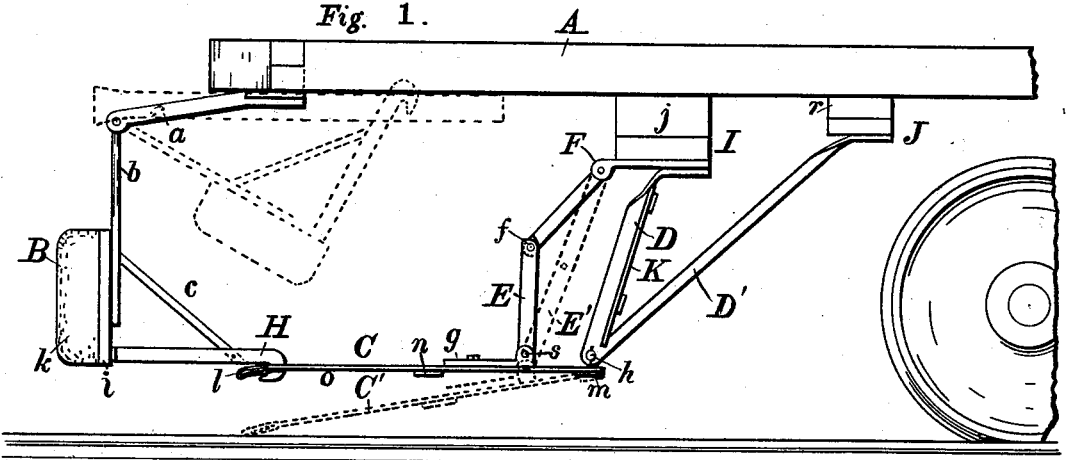
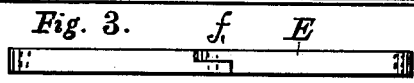
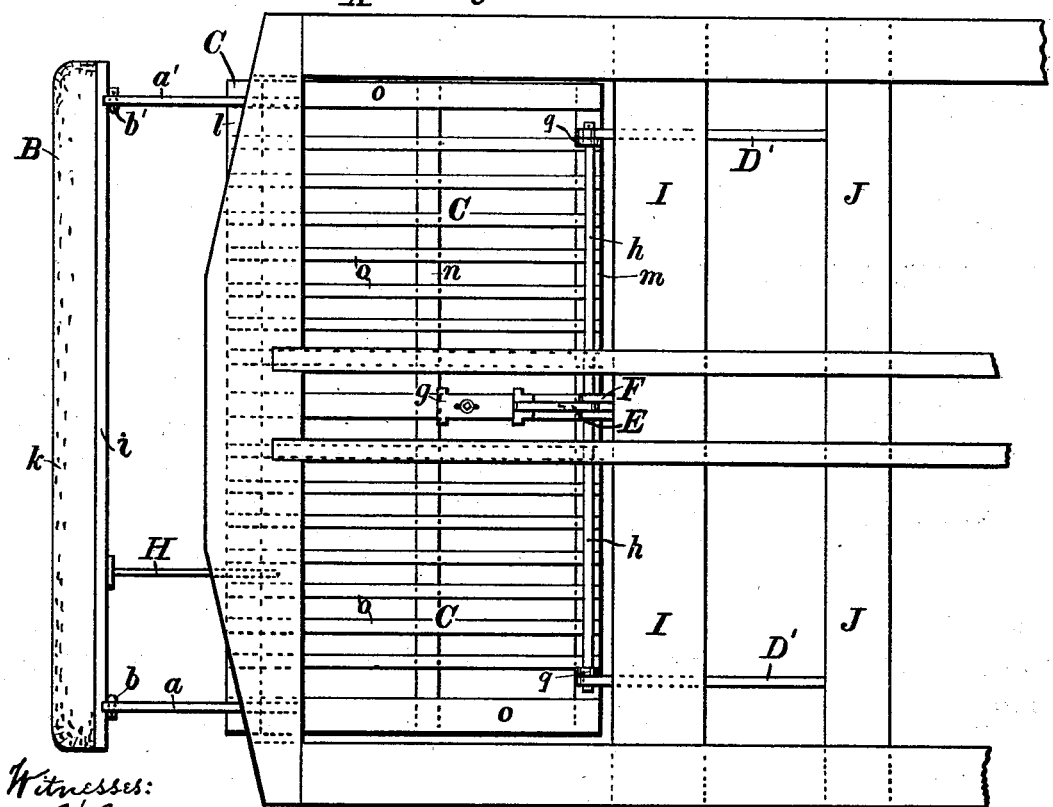
Witnesses:
R. F. Osgood.
C. G. Crannell.
Inventor:
J. Miller Kelly,
By Geo. B. Selden
Atty.

UNITED STATES PATENT OFFICE.

JOHN MILLER KELLY, OF ROCHESTER, NEW YORK.

SAFETY DEVICE FOR STREET-CARS.

SPECIFICATION forming part of Letters Patent No. 507,138, dated October 24, 1893.

Application filed June 21, 1893. Serial No. 478,392. (No model.)

*To all whom it may concern:*

Be it known that I, JOHN MILLER KELLY, a citizen of the United States, residing at Rochester, in the county of Monroe, in the State of New York, have invented certain Improvements in Safety Devices for Street-Cars, of which the following is a specification, reference being had to the accompanying drawings.

My present invention relates to certain improvements in safety-devices for street-cars, whereby an automatic lock is provided for a platform arranged in front of the running gear, so that when the forward end of the platform is detached and allowed to drop to the track by the contact of the fender with an obstacle, it is held down in that position, thereby preventing such obstacle from passing beneath the platform.

My invention also consists in certain details of the construction, all as hereinafter more fully described,—the novel features of my invention being specified in the claims annexed to the said specification.

My improvement is represented in the accompanying drawings in which—

Figure 1 is a side-elevation of a portion of the front end of a car, showing my invention applied thereto. Fig. 2 is a plan view of the same, showing the frame-work of the car. Fig. 3 represents the toggle-lever detached.

In the accompanying drawings A represents the frame-work at the lower part of the car-body, B the fender, C the movable platform, D the hangers which support the platform, and H the hook or trip attached to the fender. The fender is supported by the rods $b$ $b'$, which may be attached directly to the frame-work of the car, or the body, but are preferably carried by the arms $a$ $a'$, so that the fender is located a short distance in front of the car. The rods $b$ $b'$ are pivoted to the arms $a$ $a'$ in any suitable way. In the construction shown the rods are bent and the bent ends inserted in holes in the arms. The arms are fastened to the frame-work.

The fender B consists of a bar $i$, extending across the front of the car, and secured to the rods $b$ $b'$. The fender is preferably provided with a stuffed cushion $k$ on its forward side, which may be of any preferred style.

H is a hook or trip attached to the fender and extending rearward to engage with the front cross-bar $l$ of the platform C. A brace $c$ may be employed to stiffen the arm of the hook.

The platform C may be constructed in any suitable way, but I prefer to make it, as shown in the drawings, of a series of transverse and longitudinal metallic bars, secured together by rivets or bolts. The transverse bars are represented at $l$, $m$, and $n$, Fig. 2, and the longitudinal bars at $o$. The rear bar $m$ is provided with eyes $q$, through which passes the rod $h$, which serves as a pivot on which the rear end of the platform is supported. The ends of the rod $h$ are secured in the lower ends of the standards D, attached to the frame-work A, or preferably to a cross-bar I, secured to the body of the car with the interposed blocks $j$, which are employed to facilitate the application of my invention to cars of different heights.

D' is a brace for the hanger D, attached to the cross-bar J having blocking $r$ interposed between it and the bottom of the car.

Upon the contact of the fender B with an obstacle, it swings rearward, as indicated by the dotted lines in Fig. 1, and the hook H being disengaged from the platform, the latter falls downward until its front end rests on the track or the pavement, as represented by the dotted lines C'. In this position it will pass under the obstacle, which will slide upon the platform and be retained thereon until the car can be stopped,—the grating or partition K, at the rear of the platform or on the hangers D, preventing anything on the platform from slipping off its rear edge.

In order to provide for holding the platform down with its forward edge in the depressed position, I provide an automatic locking device, which comes into action when the platform falls, and holds its front end down so that nothing can enter beneath it. This result may be secured by any suitable automatic locking device. The jointed lever E, pivoted at F to a lug or arm on the body or the cross-bar I, and at $s$ to the platform, secures the desired result in a satisfactory manner. When the platform is depressed, as indicated at C', the jointed lever straightens itself out, as represented by the dotted lines E', and holds the platform down. The parts constituting the jointed or toggle-lever are halved onto each other, or otherwise pivotally connected together, as shown at $f$. In order to vary the effective length of the jointed lever, one of its ends is supported by an adjustable pivot,—in the arrangement shown the pivot $s$ being carried by lugs on a slide $g$, secured to the platform so that it may adjusted lengthwise thereon.

By means of the automatic locking device the platform is held downward when once depressed, and the possibility of an obstacle getting under the wheels is prevented.

I claim—

1. The combination, with the body and running gear of a car, of a movable platform located in front of the running gear and detachably supported by the body at its front end, and an automatic lock for securing the platform in its depressed position, substantially as described.

2. The combination, with the body and running gear of a car, of a movable platform supported in front of the running gear, a fender provided with a trip for supporting the front end of the platform, and an automatic lock for securing the platform in its depressed position, substantially as described.

3. The combination, with the body and running gear of a car, of a movable platform located in front of the running gear and detachably supported by the body at its front end, and a jointed lever by which the platform is locked in its depressed position, substantially as described.

4. The combination, with the pivoted platform C, of the fender B, provided with trip H, and the jointed lever E, substantially as described.

5. The combination, with the pivoted platform C, of the fender B, provided with trip H, the jointed lever E, and an adjustable bearing at one end of the lever, substantially as described.

JOHN MILLER KELLY.

Witnesses:
 GEO. B. SELDEN,
 C. G. CRANNELL.